United States Patent
Tran et al.

(10) Patent No.: US 10,762,359 B2
(45) Date of Patent: *Sep. 1, 2020

(54) COMPUTER AIDED TRAFFIC ENFORCEMENT USING DENSE CORRESPONDENCE ESTIMATION WITH MULTI-LEVEL METRIC LEARNING AND HIERARCHICAL MATCHING

(71) Applicant: NEC Laboratories America, Inc., Princeton, NJ (US)

(72) Inventors: Quoc-Huy Tran, Santa Clara, CA (US); Mohammed E. F. Salem, Hyattsville, MD (US); Muhammad Zeeshan Zia, San Jose, CA (US); Paul Vernaza, Sunnyvale, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 165 days.

This patent is subject to a terminal disclaimer.

(21) Appl. No.: 16/029,167

(22) Filed: Jul. 6, 2018

(65) Prior Publication Data
US 2019/0065868 A1     Feb. 28, 2019

Related U.S. Application Data

(60) Provisional application No. 62/553,087, filed on Aug. 31, 2017, provisional application No. 62/586,222, filed on Nov. 15, 2017.

(51) Int. Cl.
*G06K 9/00*     (2006.01)
*G06K 9/62*     (2006.01)
(Continued)

(52) U.S. Cl.
CPC ..... *G06K 9/00798* (2013.01); *G06K 9/00785* (2013.01); *G06K 9/00825* (2013.01);
(Continued)

(58) Field of Classification Search
None
See application file for complete search history.

(56) References Cited

U.S. PATENT DOCUMENTS

2017/0124711 A1* 5/2017 Chandraker ....... G06K 9/00201
2018/0137611 A1* 5/2018 Kwon .................... G06N 3/04
(Continued)

OTHER PUBLICATIONS

U.S. Appl. No. 62/543,275 Abstract, filed Aug. 2017, Stojanovic; Milos.*
U.S. Appl. No. 62/543,275 Specification, filed Aug. 2017, Stojanovic; Milos.*
Yi, "LIFT: Learned Invariant Feature Transform", Proceedings of European Conference on Computer Vision, Oct. 2016, pp. 467-483.
Choy, "Universal Correspondence Network", Proceedings of Advances in Neural Information Processing Systems, Dec. 2016, pp. 2414-2422.

(Continued)

*Primary Examiner* — Fan Zhang
(74) *Attorney, Agent, or Firm* — Joseph Kolodka

(57) ABSTRACT

Systems and methods for detecting traffic scenarios include an image capturing device which captures two or more images of an area of a traffic environment with each image having a different view of vehicles and a road in the traffic environment. A hierarchical feature extractor concurrently extracts features at multiple neural network layers from each of the images, with the features including geometric features and semantic features, and for estimating correspondences between semantic features for each of the images and refining the estimated correspondences with correspondences between the geometric features of each of the images to generate refined correspondence estimates. A traffic localization module uses the refined correspondence estimates to determine locations of vehicles in the environment in three dimensions to automatically determine a traffic scenario according to the locations of vehicles. A notification device generates a notification of the traffic scenario.

20 Claims, 7 Drawing Sheets

(51) Int. Cl.
  *G06N 3/04* (2006.01)
  *G06K 9/46* (2006.01)
  *G06K 9/66* (2006.01)
  *G06N 3/08* (2006.01)
  *G06T 17/05* (2011.01)

(52) U.S. Cl.
  CPC ............. *G06K 9/46* (2013.01); *G06K 9/4628* (2013.01); *G06K 9/629* (2013.01); *G06K 9/6262* (2013.01); *G06K 9/6274* (2013.01); *G06K 9/6276* (2013.01); *G06K 9/66* (2013.01); *G06N 3/0454* (2013.01); *G06N 3/08* (2013.01); *G06T 17/05* (2013.01); *G06T 2200/08* (2013.01); *G06T 2207/20081* (2013.01)

(56) References Cited

U.S. PATENT DOCUMENTS

2018/0225504 A1* 8/2018 Sargent ................. G06K 9/0063
2019/0050648 A1* 2/2019 Stojanovic .............. G06T 11/60

OTHER PUBLICATIONS

Song, "Robust Scale Estimation in Real-Time Monocular SFM for Autonomous Driving", Proceedings of IEEE Conference on Computer Vision and Pattern Recognition, Jun. 2014, pp. 1-9.

Dhiman, "A Continuous Occlusion Model for Road Scene and Understanding", Proceedings of IEEE Conference on Computer Vision and Recognition, Jun. 2016, pp. 4331-4339.

* cited by examiner

COMPUTER AIDED TRAFFIC ENFORCEMENT USING DENSE CORRESPONDENCE ESTIMATION WITH MULTI-LEVEL METRIC LEARNING AND HIERARCHICAL MATCHING

RELATED APPLICATION INFORMATION

This application claims priority to 62/553,087, filed on Aug. 31, 2017, and 62/586,222, filed on Nov. 15, 2017, incorporated by reference herein its entirety. This application is related to an application entitled "DENSE CORRESPONDENCE ESTIMATION WITH MULTI-LEVEL METRIC LEARNING AND HIERARCHICAL MATCHING", and which is incorporated by reference herein in its entirety.

BACKGROUND

Technical Field

The present invention relates to dense visual correspondence estimation, and more particularly, dense correspondence estimation with multi-level metric learning and hierarchical matching.

Description of the Related Art

Various computer vision tasks utilize correspondence estimation between images to determine elements or objects in an environment, such as camera location or object location. However, performing these tasks with hand-crafted descriptors does not match the performance of task-specific learned descriptors. Moreover, shallow feature extraction and deep feature extraction in convolutional neural networks (CNNs) have trade-offs in performance. For example, a shallow feature extraction yields low-level, geometric features which are sensitive to local structures in the images and are good for high precision tasks. Meanwhile, deep feature extraction yields high-level, semantic features which are robust to appearance changes in the images, leading to high recall.

SUMMARY

According to an aspect of the present principles, a system is provided for detecting traffic scenarios. The system includes an image capturing device which captures two or more images of an area of a traffic environment with each image having a different view of vehicles and a road in the traffic environment. A hierarchical feature extractor concurrently extracts features at multiple neural network layers from each of the two or more images of the area, with the features including geometric features and semantic features, and for estimating correspondences between semantic features for each of the two or more images and refining the estimated correspondences with correspondences between the geometric features of each of the two or more images to generate refined correspondence estimates. A traffic localization module uses the refined correspondence estimates to determine locations of vehicles in the environment in three dimensions to automatically determine a traffic scenario according to the locations of vehicles. A notification device generates a notification of the traffic scenario.

According to another aspect of the present principles, a method is provided for detecting a traffic scenario. The method includes capturing two or more images of an area of a traffic environment with each image having a different view of vehicles and a road in the traffic environment. Features are concurrently extracted at multiple neural network layers from each of the two or more images of the scene using a hierarchical feature extractor, with the features including geometric features and semantic features. Correspondences are estimated between semantic features for each of the two or more images and refining the estimated correspondences with correspondences between geometric features of each of the two or more images to generate refined correspondence estimates. Locations of vehicles are determined in the environment in three dimensions using the refined correspondence estimates to automatically determine a traffic scenario according to the locations of vehicles. A notification of the traffic scenario is generated.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
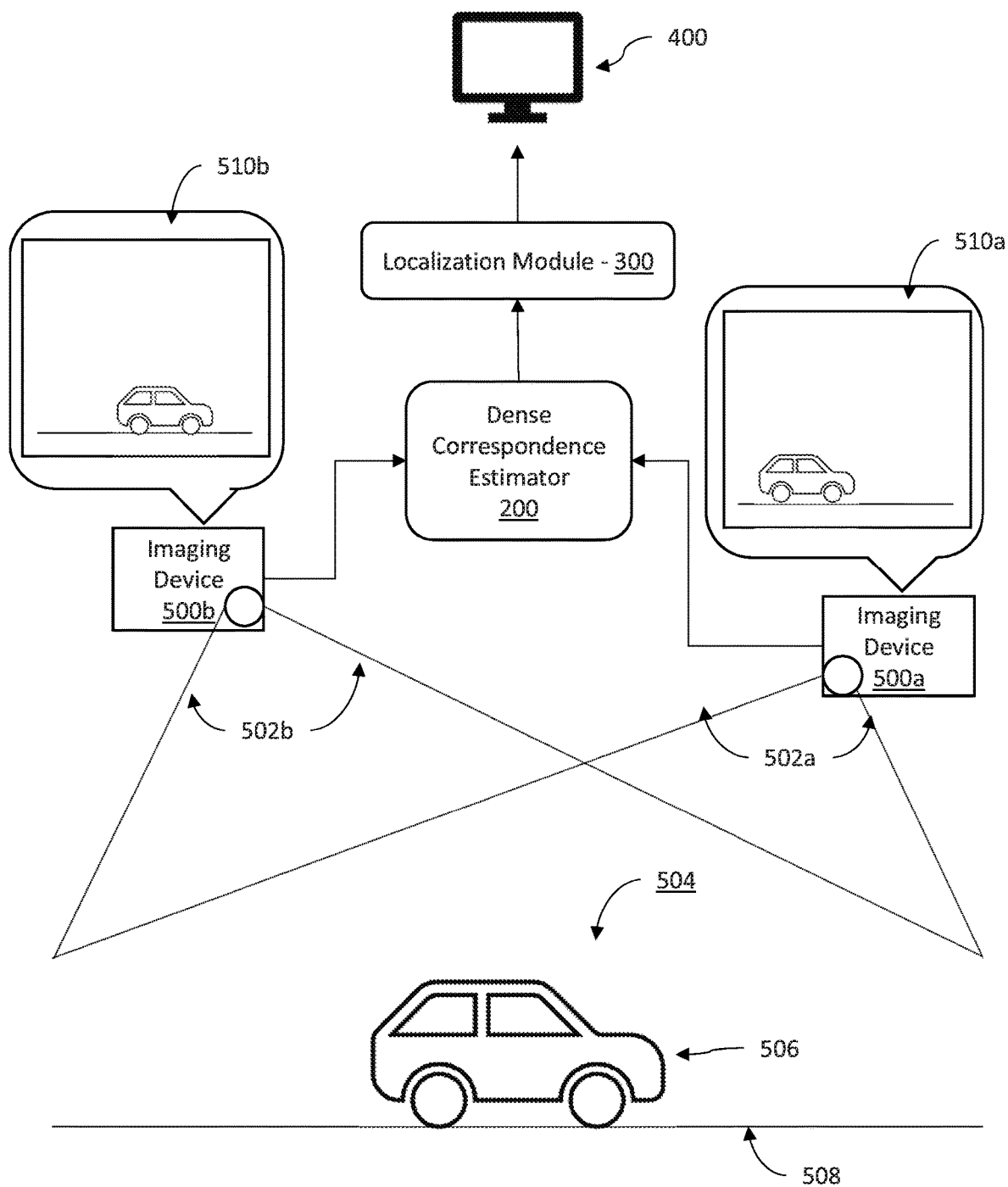
FIG. 1 is a block/flow diagram illustrating a system/method for traffic enforcement using dense correspondence estimation with a hierarchical structure, in accordance with the present principles.

In accordance with the present principles, systems and methods are provided for dense correspondence estimation with multi-level metric learning and hierarchical matching.

In one embodiment, a convolutional neural network (CNN) is employed for feature descriptor learning to be used in dense correspondence estimation, flexible ground modeling, and localization. Thus, two images are fed into the CNN with each image having a different view of an environment, whether by time or by location. The CNN compares the two views to estimate correspondences between them by using a Siamese structure. The correspondences can be used to reconstruct a flexible ground surface and determine a location and movement in 3-dimensional (3D) space of elements and objects in the environment, such as, e.g., the location of the camera or device used for capturing the images, or the location of objects in the images. Therefore, a more effective CNN can produce more accurate correspondence estimates, thus improving the accuracy of the reconstruction and localization.

The CNN can be made more effective by leveraging multiple convolutional layers with a hierarchical strategy. The hierarchical strategy combines features extracted from deep layers for high-level, semantic features with features extracted from shallow layers for low-level, geometric details. The semantic features are extracted from one or more deep convolutional layers and are invariant to appearance changes in the images. The geometric features, however, are extracted from one or more shallow convolutional layers and are more sensitive to local structures in the images. Both the semantic features and the geometric features can be combined to form a dense and accurate correspondence estimation. This correspondence estimation can, therefore, be used for flexible ground modeling and localization.

Moreover, the CNN can be trained using deep supervision for feature descriptor learning. Therefore, multiple convolutional layers throughout the depth of the CNN can be trained simultaneously, thus improving the effectiveness of the CNN. The training can include hard negative mining with correspondence contrastive loss at multiple layers of the CNN. Descriptors for matched interest points can be placed close together in Euclidean space, whereas unmatched interest points can be spaced far apart. Thus, correspondences can be learned simultaneously throughout the depth of the CNN, thereby improving the accuracy of feature descriptor learning.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block/flow diagram of a system/method for traffic enforcement using dense correspondence estimation with a hierarchical structure is illustratively depicted in accordance with one embodiment of the present principles.

Machine vision tools for analyzing images of roadways can improve tasks related to traffic scenarios and situations such as, e.g., traffic enforcement, automated navigation, map building, autonomous driving, and automated driver alert systems, and among others. For example, traffic enforcement can be facilitated by analyzing images of vehicles in a roadway.

As an example, according to an embodiment of aspects of the present invention, a dense correspondence estimator 200 is employed by, e.g., a law enforcement officer in a traffic environment, such as, e.g, a roadway 504 using 2-dimensional (2D) images captured by imaging devices 500*a* and 500*b*.

The imaging devices 500*a* and 500*b* can be, e.g. a single camera that is either mounted in a single fixed location and capturing images of moving objects, such as, e.g., a vehicle 506, or any other configurations suitable for capturing moving objects in the traffic environment. According to an embodiment of the present invention, the imaging devices 500*a* and 500*b* are a single camera that captures relative movement of objects in the roadway 504. For example, the imaging device 500*a*/500*b* can be, e.g., a dashboard camera (dashcam) mounted in a police vehicle.

The imaging device 500*a*/500*b* captures images of a roadway 504 and the relative movement of objects such as a road 508 and a vehicle 506. Accordingly, the imaging device 500*a* captures an image at a first time to produce an image having a first perspective 502*a*. The imaging device 500*b* captures an image at a second time to produce an image having a second perspective 502*b*. The first perspective 502*a* and the second perspective 502*b*, thus, each capture the relative location of objects in the roadway 504 at the first time and at the second time. Moreover, the first perspective 502*a* and the second perspective 502*b* can also capture different perspectives of the road 508 and the relative motion of the imaging device 500*a*/500*b* at the first time and at the second time.

Both the first image 510*a* and the second image 510*b* can be provided to a dense correspondence estimator 200, such as the dense correspondence estimator 200 described above.

The dense correspondence estimator 200 can have a hierarchical structure, such that a given image is analyzed by a CNN and features are extracted from more than one layer in the CNN. For example, features can be extracted from a given image at a shallow layer, such as, e.g., a second convolution layer, and at a deep layer, such as, e.g., at a fifth convolutional layer. Other numbers and depths of layers are contemplated. Thus, both high-level, semantic and low-level, geometric features are extracted from the image via the deep layer and the shallow layer of the CNN respectively.

Accordingly, the dense correspondence estimator 200 extracts both semantic and geometric features from the images 510a and 510b captured by the imaging device 500a/500b. The correspondences can be estimated between the semantic features of the first image 510a and the second image 510b, and between the geometric features from the first image 510a and the second image 510b. The correspondences can then be fused hierarchically to improve the precision of the correspondences for dense correspondence estimates.

The dense correspondence estimates can be provided to a localization module 300, such as the localization module 300 described above. Accordingly, the localization module 300 can analyze the dense correspondence estimates to generate a flexible ground surface to precisely and accurately set a scale for a reconstruction of the roadway 504. The reconstruction can then be used for localization of the vehicle 506 as well as the imaging device 500a/500b. Thus, a 3D environment can be reconstructed based on the change in perspective from a first perspective 502a to a second perspective 502b. As a result, characteristics such as, e.g., the locations and speeds of the vehicle 506 and/or the imaging device 500a/500b can be determined from the dense correspondences and the environment reconstruction.

A computing device 400 can then analyze the environment reconstruction, including the locations and speeds of the imaging device 500a/500b and the vehicle 506 to automatically determine if a traffic infraction has occurred. Because the dense correspondence estimator 200 can determine dense and accurate correspondences between the images 510a and 510b, the localization module 300 can accurately and precisely determine the relative locations and velocities of the imaging device 500a/500b and the vehicle 506. Thus, the computing device 400 can use the data from the localization module 300 to accurately and precisely notify the law enforcement officer of the behavior based on speed and location.

For example, the environment reconstruction from the localization module 300 can be used to compare the speeds of the imaging device 500a/500b and the vehicle 506 with local speed limits and automatically determine whether the vehicle 506 was speeding. As another example, the computing device 400 can use the localization of the vehicle 506 to determine if the vehicle 506 is parked illegally, or driving erratically in such a way that may indicate drunk driving, or other scenarios that indicate a traffic violation. In each case and in other traffic-related scenarios, the law enforcement officer can be notified of the behavior through a display of the computing system 400 or through a remote display (not shown in the figure). Thus, the law enforcement officer can enforce traffic laws in a faster, more efficient, and more accurate manner.

Figure 2:
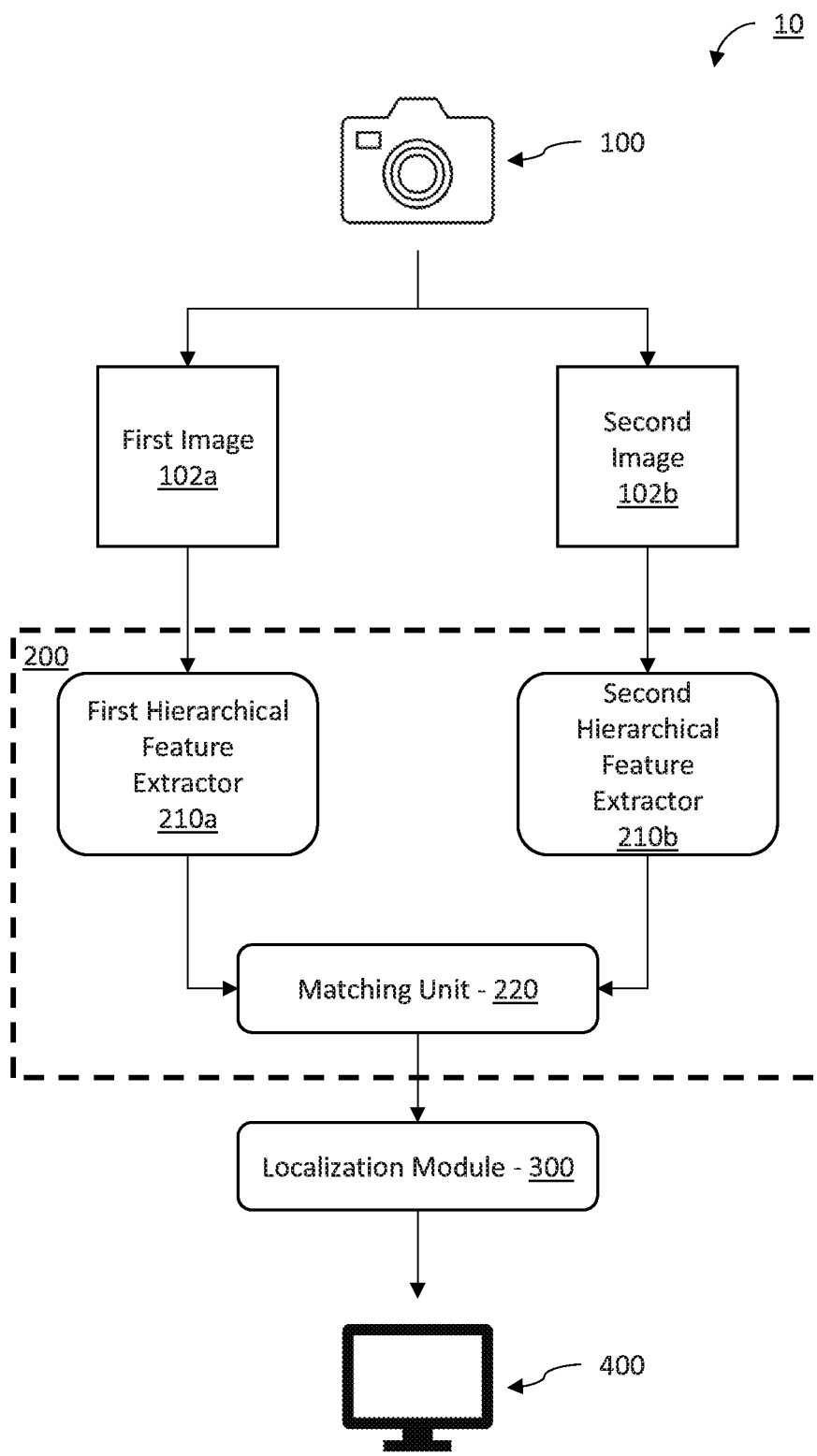
FIG. 2 is a block/flow diagram illustrating an overview of a system/method for localization using features extracted from two views of an environment, in accordance with the present principles.

Referring now to FIG. 2, an overview of a system/method for localization using features extracted from two views of an environment is illustratively depicted in accordance with one embodiment of the present principles.

In one embodiment, a system for localization 10 is contemplated. The localization system 10 can include an imaging device 100. The imaging device 100 captures images of a given area of an environment to produce multiple images of objects in that area. Thus, the imaging device 100 can be a single camera in a fixed or moving location such that images having different perspectives of objects in the area can be produced. The different perspectives can include, e.g., a fixed object imaged from multiple locations using one imaging device 100, a moving object imaged from multiple locations using one imaging device 100, or a moving object imaged from a fixed location using one imaging device 100. Therefore, the multiple images of the objects, such as a first image 102a and a second image 102b, depict the objects with different perspectives.

Using the first image 102a and the second image 102b, a matching task can be performed to, e.g., perform optical flow estimation, flexible ground estimation, monocular visual odometry, monocular visual 3-dimensional (3D) object localization, and other machine vision tasks. Therefore, the different perspectives between the first image 102a and the second image 102b can be leveraged during matching to accomplish one or more of these tasks. However, to perform matching, correspondences between the images 102a and 102b are estimated using a dense correspondence estimator 200. The dense correspondence estimator 200 can include a processing device or system of processing devices, including, e.g., one or more central processing units (CPUs), one or more graphical processing units (GPUs), one or more memory devices, one or more storage device, one or more caches and/or one or more buffers, etc. For example, the first image 102a and the second image 102b can be, e.g., stored in a memory or storage device, such as, e.g., a hard drive, a database, a solid state drive, a flash memory, random access memory (RAM), or any other volatile or non-volatile memory device.

To facilitate matching, the dense correspondence estimator 200 extracts features from the first image 102a and the second image 102b using a first hierarchical feature extractor 210a and a second hierarchical feature extractor 210b, respectively. The first and second hierarchical feature extractors 210a and 210b can include a hierarchical structure that passes the first and second images 102a and 102b through multiple levels of filtering. The hierarchical structure can be leveraged to improve the performance of later matching because features extracted from a particular level of the hierarchy will have particular characteristics. Thus, a hierarchical strategy that extracts features at multiple levels in the hierarchy can produce a feature image at each of the levels that has particular characteristics to produce a spectrum of feature images that have complementary capabilities from each of the first and the second hierarchical feature extractors 210a and 210b. Each of the first hierarchical feature extractor 210a and the second hierarchical feature extractor 210b can be implemented in, e.g., a same or different processing device, such as, e.g., a central processing unit (CPU), graphical processing unit (GPU) or other processing device.

Each of the feature images from each of the first and the second hierarchical feature extractors 210a and 210b can be concurrently provided to a matching unit 220. The matching unit 220 matches the feature images from the first hierarchical feature extractor 210a with the feature images of the second hierarchical feature extractor 210b according to the level at which the features in the feature images have been extracted. The matching can include matching corresponding features in each of the feature maps, such as, e.g., objects in common in each image 102*a* and 102*b*, such as, e.g., a vehicle, person, terrain and topology of the ground surface or other objects present in both the first image 102*a* and the second image 102*b*. Correspondences can then be estimated according to the corresponding features using, e.g., distances between corresponding features with a distance calculation, such as, e.g., Euclidean distance. The matching unit 220 can include, e.g. one or more processing devices and one or more buffers or caches for storing the extracted features and the matched features.

The estimated correspondences can be used by a localization module 300 to perform a localization task using flexible ground modeling, optical flow estimation, semantic part transfer, and among others. Accordingly, the localization module 300 can include, e.g., a processing device for processing the estimate correspondences as well as a buffer, cache, storage, memory or other device for storing the estimate correspondences to be processed. The processing device of the localization module 300 can be the same or different from the processing device or devices of the dense correspondence estimator 200.

One embodiment, according to aspects of the present invention, utilizes the estimate correspondences for flexible ground estimation. Because a hierarchical strategy is used for feature extraction, the estimated correspondences are dense and accurate. Using dense correspondences pertaining to a ground surface, such as, e.g., the terrain or topology of the ground surface in the area captured in the images, a flexible ground surface (e.g., a three dimensional model including surface changes as opposed to a flat 3D plane) can be reconstructed for, e.g., flexible ground modeling. Thus, tasks such as, e.g., monocular visual odometry and monocular visual 3D object localization can be more accurately performed, especially in situations where a ground surface is not a flat 3D plane.

The output of the localization module 300 can be provided to a notification device such as a display 400 for notifying a user. For example, the localization of objects using the dense ground correspondences can be, e.g., used to build a map of objects in a given area, or notify a user of nearby objects or object movement, or any other applications for localization. Thus, the location or movement, or both, of an object can be provided to a user, e.g., as an alert, via the display 400 to alert the user. The user can then employ the localization information, e.g, while driving, in traffic enforcement, for navigation, or for other purposes.

Figure 3:
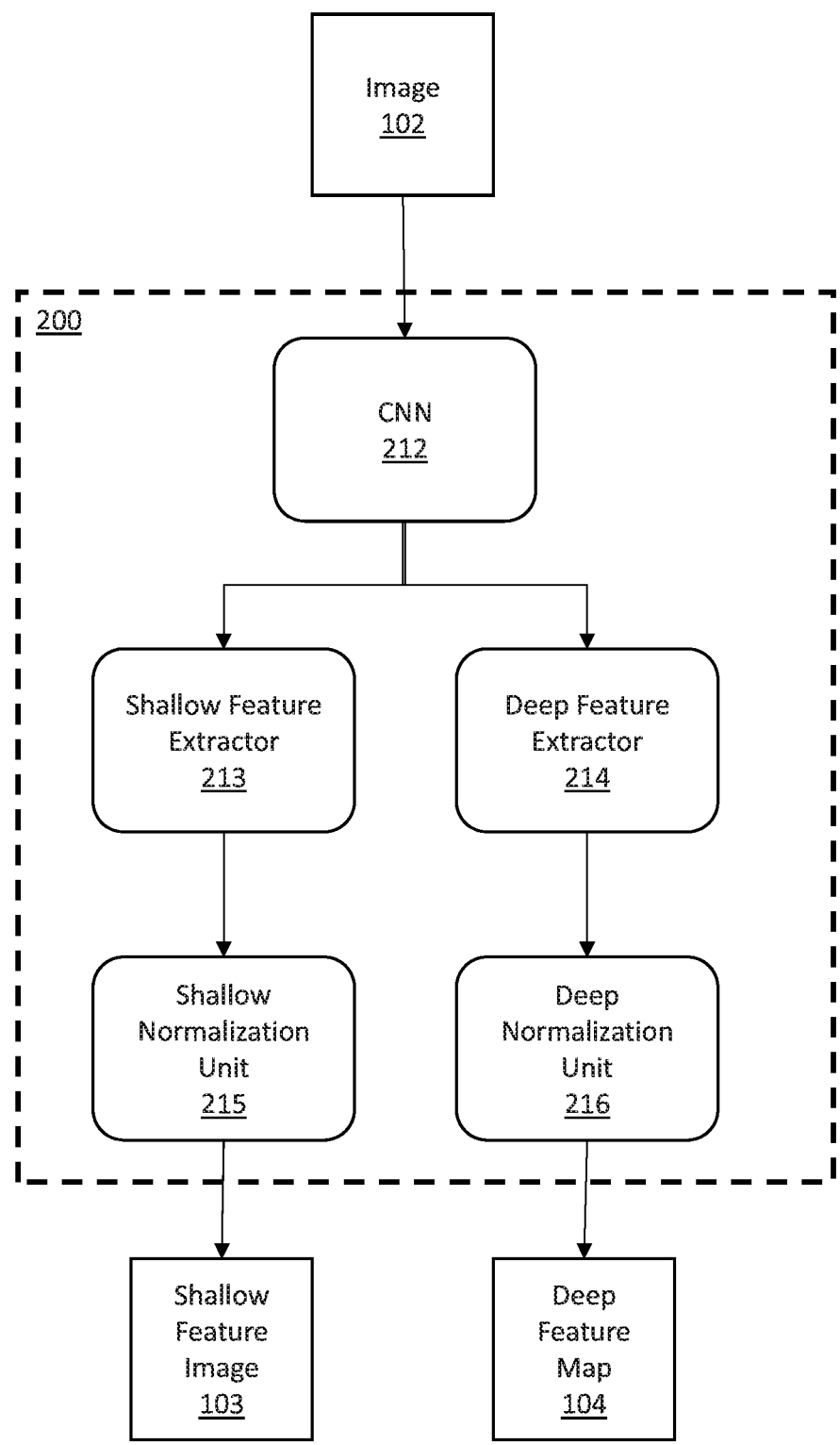
FIG. 3 is a block/flow diagram illustrating a system/method for multi-level extraction of features from a view of an environment using a convolutional neural network (CNN), in accordance with the present principles.

Referring now to FIG. 3, a block/flow diagram of a system/method for multi-level extraction of features from a view of an environment using a convolutional neural network (CNN) is illustratively depicted in accordance with one embodiment of the present principles.

A given environment image 102, such as the first image 102*a* or second image 102*b*, can undergo hierarchical feature extraction by a hierarchical feature extractor 210 including a CNN 212, a shallow feature extractor 213, a deep feature extractor 214, a shallow normalization unit 215, and a deep normalization unit 216. Thus, the hierarchical feature extractor 210 utilizes a hierarchical strategy using multiple layers of the CNN 212 to produce a shallow feature image 103 and a deep feature image 104. A similar CNN 212 can be incorporated into each hierarchical feature extractor 210 of a dense correspondence estimator 200 corresponding to each image. Each of the CNNs 212 in the dense correspondence estimator 200 are incorporated in a Siamese structure. Thus, each CNN 212 is structured parallel to each other CNN 212 and corresponds to a respective given image 102. The feature extraction modules of each CNN 212 share common weights with the corresponding feature extraction modules of each other CNN 212 for joint training. The CNN 212 can include, e.g., a memory or storage device for storing, caching and/or buffering the layers of the CNN 212 as well as the image 102.

The environment image 102 is input into the CNN 212. The CNN 212 can be any suitable neural network for analyzing images, such as, e.g., a Visual Geometry Group (VGG) network, or other suitable CNNs. Thus, the CNN 212 employs multiple layers of convolutions for filtering images. The hierarchical strategy leverages these multiple layers of convolutions by extracting features, not just at the final or deepest convolutional layer, but intermediate layers as well. In one possible embodiment, two convolutional layers are used for feature extraction.

In image correspondence tasks, shallow feature extraction can be beneficial for determining geometric correspondences because the shallow CNN layers learn low-level details that are more sensitive to object appearances. Deep layers, however, capture high-level abstract concepts, such as object types and object parts. Thus, features in deeper levels are less sensitive to detail, but can assist with greater recall. Therefore, shallow-levels generate features that are more suitable for small pixel displacement thresholds. Deep levels, on the other hand, are more suitable for large pixel displacement thresholds. Accordingly, utilizing a shallow feature extractor 213 and a deep feature extractor 214 facilitates sensitivity to low-level appearance while also improving recall by leveraging high-level concepts.

Thus, the CNN 212 concurrently provides information from a shallow layer, such as, e.g., a second convolutional layer, to the shallow feature extractor 213 and information from a deep layer, such as, e.g., a fifth convolutional layer, to the deep feature extractor 214. The information provided from the CNN 212 can include activation maps for the respective layers. Each feature extractor 213 and 214 can then extract features around points of interest concurrently from activation maps.

In one possible embodiment, the shallow feature extractor 213 can be augmented with multiple convolutional feature extractors of various sizes. Output from each convolutional feature extractor is concatenated to produce a single feature map from the set of feature maps corresponding to the multiple convolution feature extractors.

Once extracted, shallow feature maps and deep feature maps can be normalized by the shallow normalization unit 215 and the deep normalization unit 216, respectively. The normalization units 215 and 216 normalize the features using, e.g., an L-2 normalization, or any suitable normalization technique.

As a result, the hierarchical feature extractor 210 generates two feature map images, a shallow feature image 103 and a deep feature image 104 corresponding to the shallow feature extractor 213 and the deep feature extractor 214, respectively. The shallow feature image 103 includes shallow features that contain low-level, geometric details. Because the features are low-level, the features are sensitive to small thresholds in pixel distances. Thus, when compared to another image view, a small change in distance of a common pixel can be recognized with the shallow features of the shallow feature image 103.

The deep feature image 104 includes deep features extracted by the deep feature extractor 214. The features of the deep feature image 104 include high-level, semantic details. Thus, common objects with another view of the environment have high recall. Because the features are higher-level, the features are also less specific, and thus less sensitive to small changes in distance of pixels. Thus, the shallow feature image 103 and the deep feature image 104 have complimentary capabilities in pixel distances. As a result, using both of a shallow feature image and a deep feature image results in both improved precision and accuracy, as well as improved recall and semantic recognition in subsequent analysis and matching.

While an embodiment using one shallow feature extractor 103 and one deep feature extractor 104 has been described, aspects of the present invention include any number of feature extractors, up to and including a feature extractor for every layer of the CNN 212.

Figure 4:
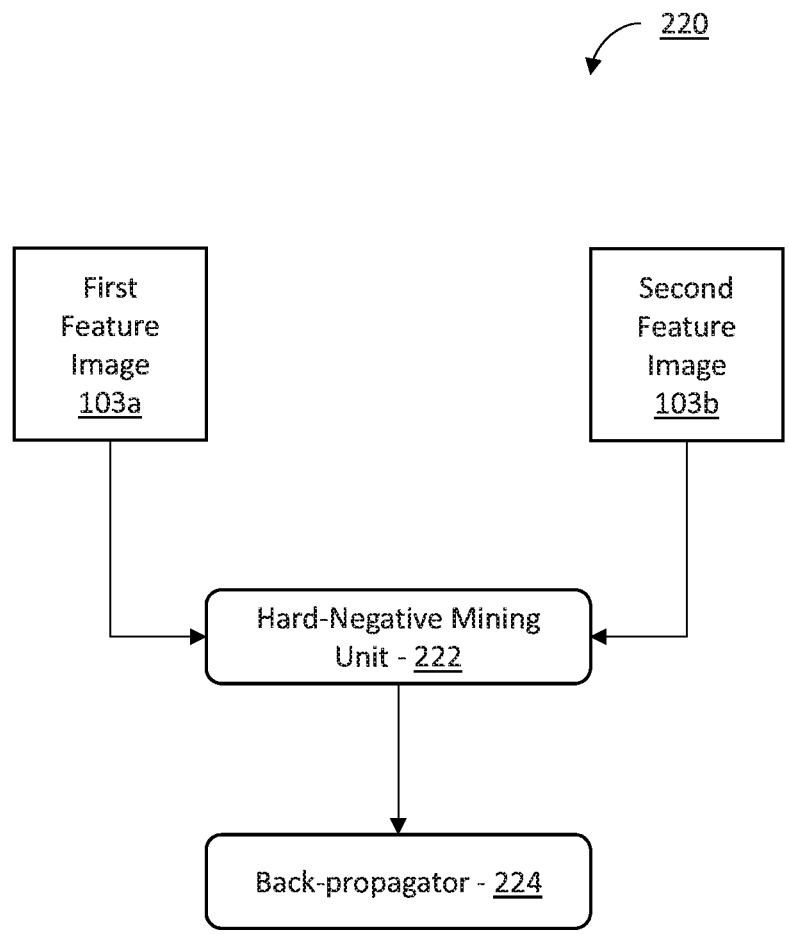
FIG. 4 is a block/flow diagram illustrating a system/method for training a CNN for feature extraction with hard negative mining and contrastive loss at multiple layers of the CNN, in accordance with the present principles.

Referring now to FIG. 4, a block/flow diagram of a system/method for training a CNN for feature extraction with hard negative mining and contrastive loss at multiple layers of the CNN is illustratively depicted in accordance with one embodiment of the present principles.

Each hierarchical feature extractor, such as the first hierarchical feature extractor 210a and the second hierarchical feature extractor 210b, produces a corresponding feature image, such as first feature image 103a and second feature image 103b. Each of the first feature image 103a and the second feature image 103b is produced from a corresponding CNN 212 in a Siamese structure, as discussed above. Therefore, each feature image 103a and 103b has been produced using tied weights for the feature extraction modules.

Using the two feature images 103a and 103b, training can be performed to learn descriptors rather than using handcrafted descriptors. Training can be performed by providing both the first feature image 103a and the second feature image 103b to a hard-negative mining unit 222. The hard-negative mining unit 222 identifies corresponding features of the two images 103a and 103b and determines a distance between the interest points of corresponding features. Using this distance, the hard-negative mining unit 222 can determine that two corresponding features are a wrong correspondence because the distance is greater than a margin value m. Accordingly, the hard-negative mining unit 222 can include, e.g. one or more processing devices and one or more buffers or caches for storing the first and second feature images 103a and 103b.

A correspondence contrastive loss (CCL) function can be implemented by the hard-negative mining unit 222 to learn embedding functions that place descriptors for matching interest points close together while moving non-matching interest points further apart. Thus, the hard-negative mining unit 222 employs a CCL function, such as equation 1 below:

$$CCL = \frac{1}{2N}\sum_j^L \sum_i^N s_i \cdot \|I_I^j(x_i) - I_{I'}^j(x_i')\|^2 + \qquad \text{Equation 1}$$
$$(1 - s_i) \cdot \max(0, m - \|I_I^j(x_i) - I_{I'}^j(x_i')\|)^2,$$

where CCL is the loss, N is the total number of interest point pairs {x,x'} with ground-truth labels s, where x and x' are the pixel locations in the first image 102a and the second image 102b respectively and s is 1 for a positive pair whereas 0 for a negative pair, j is the feature level of the L feature levels, I and I' represent the first feature image 103a and the second feature image 103b respectively, i is an index for the interest point pair of the N interest point pairs, $I_I^j$ and $I_{I'}^j$ are the descriptors extracted from the jth feature level of the first feature image 103a and the second feature image 103b respectively, and m is the distance margin.

Thus, the first feature image 103a is compared with the second feature image 103b with the hard-negative mining unit 222 to determine the contrastive loss, such as, e.g., a CCL according to Equation 1 above. The determined loss can be back-propagated with a back-propagator 224 to update the weights in the layers of the CNN 212 that produced the first and second feature images 103a and 103b, respectively. Thus, the CNN 212 and feature extractors 213 and 214 corresponding to each of the first feature image 103a and second feature image 103b can be trained.

The training can, e.g., be performed in an on-the-fly fashion such that hard-negative mining and weight updating are performed in each iteration of the training of the CNN 212. Training can also be, e.g., a distinct process, or it can be performed continuously during actual use of the CNN 212. Thus, the CNN 212 can be constantly updated and refined while correspondences are being estimated. Accordingly, a cache, memory or buffer device can be used to store receive and store the CNN 212, the feature extractors 213 and 214 as well as the error determined by Equation 1. Moreover, the back-propagator can include, e.g., one or more processing devices to process the CLL calculated by Equation 1.

Figure 5:
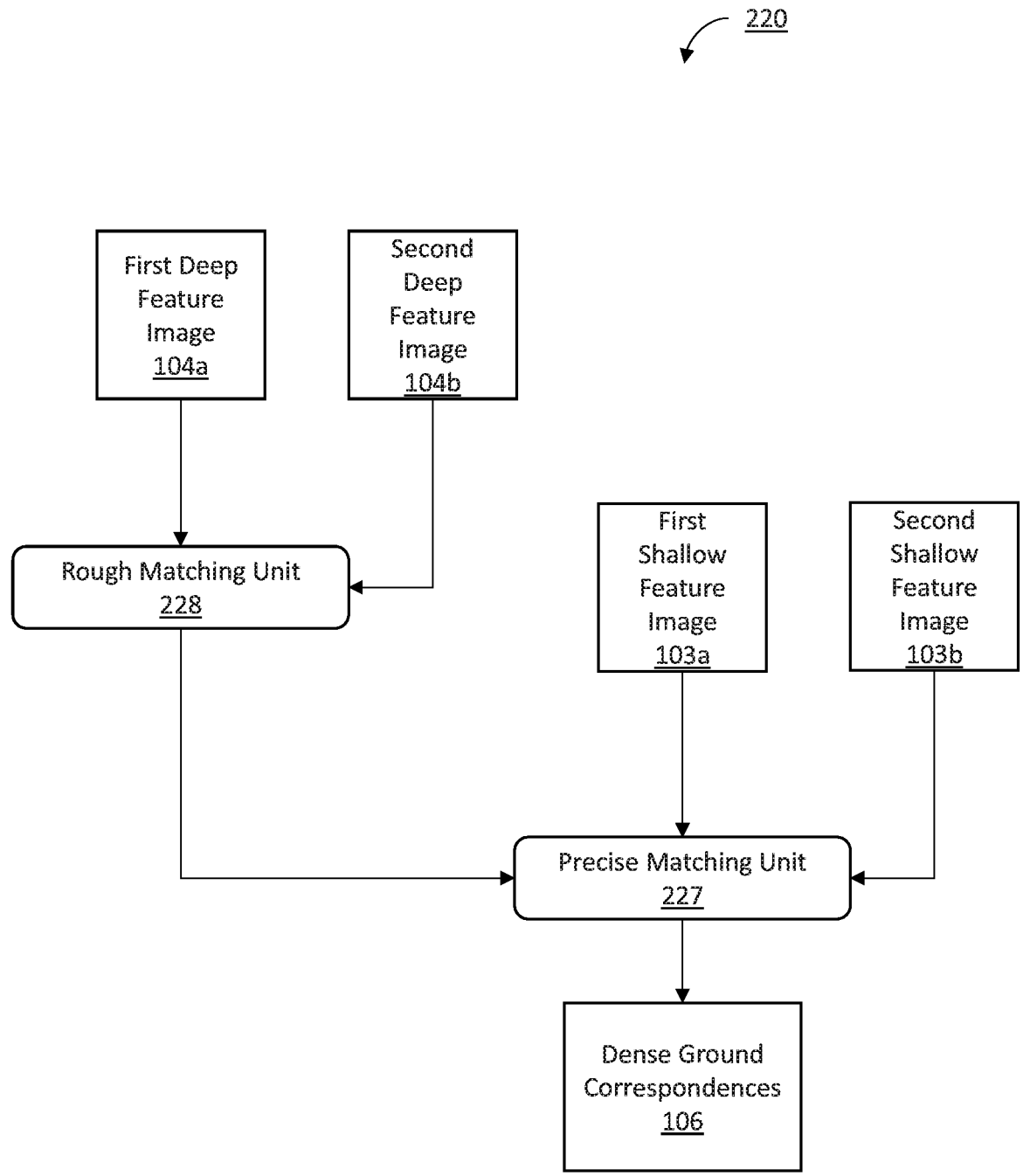
FIG. 5 is a block/flow diagram illustrating a system/method for hierarchical matching of deep and shallow features extracted from two views of the environment, in accordance with the present principles.

Referring now to FIG. 5, a block/flow diagram of a system/method for hierarchical matching of deep and shallow features extracted from two views of the environment is illustratively depicted in accordance with one embodiment of the present principles.

According to aspects of an embodiment of the present invention, dense correspondence estimation is improved through a hierarchical estimation strategy. As discussed above, the strategy includes extracting feature images from more than one convolutional layer of a CNN, at least one shallow layer and at least one deep layer. This strategy can be implemented in a Siamese CNN structure where a first deep feature image 104a and a first shallow feature image 103a are extracted from a deep convolution layer and a shallow convolution layer respectively of a first CNN, and a second deep feature image 104b and a second shallow feature image 103b are extracted from a deep convolution layer and a shallow convolution layer respectively of a second CNN. Each feature image can be extracted in a manner similar to that described in reference to FIG. 2 above. Each of the first feature images 103a and 104a and the second feature images 103b and 104b correspond to the first and second input images of an environment. Thus, the first feature images 103a and 104a and the second feature images 103b and 104b can be matched in, e.g., a matching unit 220 to generate dense correspondences for the two input images.

In one embodiment, the dense correspondences are generated by separately matching the deep feature images 104a and 104b and the shallow feature images 103a and 103b, and hierarchically fusing the resulting correspondences to leverage the characteristics of both the deep feature correspondences and the shallow feature correspondences. Thus, a rough matching unit 228 is employed to match the first deep feature image 104a and the second deep feature image 104b.

As discussed above, the feature images include features identified by the CNN layers, with associated interest points including specified pixels. Thus, in matching, the rough matching unit 228 can, e.g., compare a given interest point with an identified feature in the first deep feature image 104a with a nearest neighbor feature corresponding to an interest point in the second deep feature image 104b. The distance, such as, e.g., a Euclidean distance, can be computed between the features and nearest neighbor search can be used to establish a correspondence between the interest points.

A similar operation can be performed by the precise matching unit 227 using the first shallow feature image 103a and the second shallow feature image 103b. Therefore, an identified feature corresponding to an interest point in the first shallow feature image 103a can be matched with a nearest neighbor feature corresponding to an interest point in the second shallow feature image 103b. A distance between the features can be computed and a correspondence between the interest points can then be determined via nearest neighbor search.

Because the shallow feature images 103a and 103b capture low-level features including geometric features, the matching and the correspondence estimates determined by the precise matching unit 227 include matches with lower thresholds for distances between interest points. Thus, the precise matching unit 227 estimates fine, or precise, correspondences between the first shallow feature image 103a and the second shallow feature image 103b. In contrast, the rough matching unit 228 utilizes the deep feature images 104a and 104b, which capture high-level, semantic features. Thus, the rough matching unit 228 is robust to geometric changes and has greater recall. Therefore, the rough matching unit 228 estimates coarse, or rough, correspondences that are accurate for semantic correspondences rather than geometric correspondences between the first deep feature image 104a and the second deep feature image 104b.

To leverage the strengths of the rough matching unit 228 and the precise matching unit 227, the correspondence estimates from each matching unit 228 and 227 can be fused hierarchically to obtain more precise feature matches. For example, the given interest point of the first deep feature image 104a and the matching interest point of the second deep feature image 104b from the rough matching unit 228 can be provided to the precise matching unit 227. Using the shallow feature maps 103a and 103b, the precise matching unit 227 can refine the matching interest points identified by the rough matching unit 228 to improve the precision of pixel distance changes between the two input images. Thus, the coarse matching of semantic features can be performed by the rough matching unit 228. The matching can then be made more precise using geometric features that are more sensitive to differences between the input images to improve the measure of distance between interest points.

Figure 6:
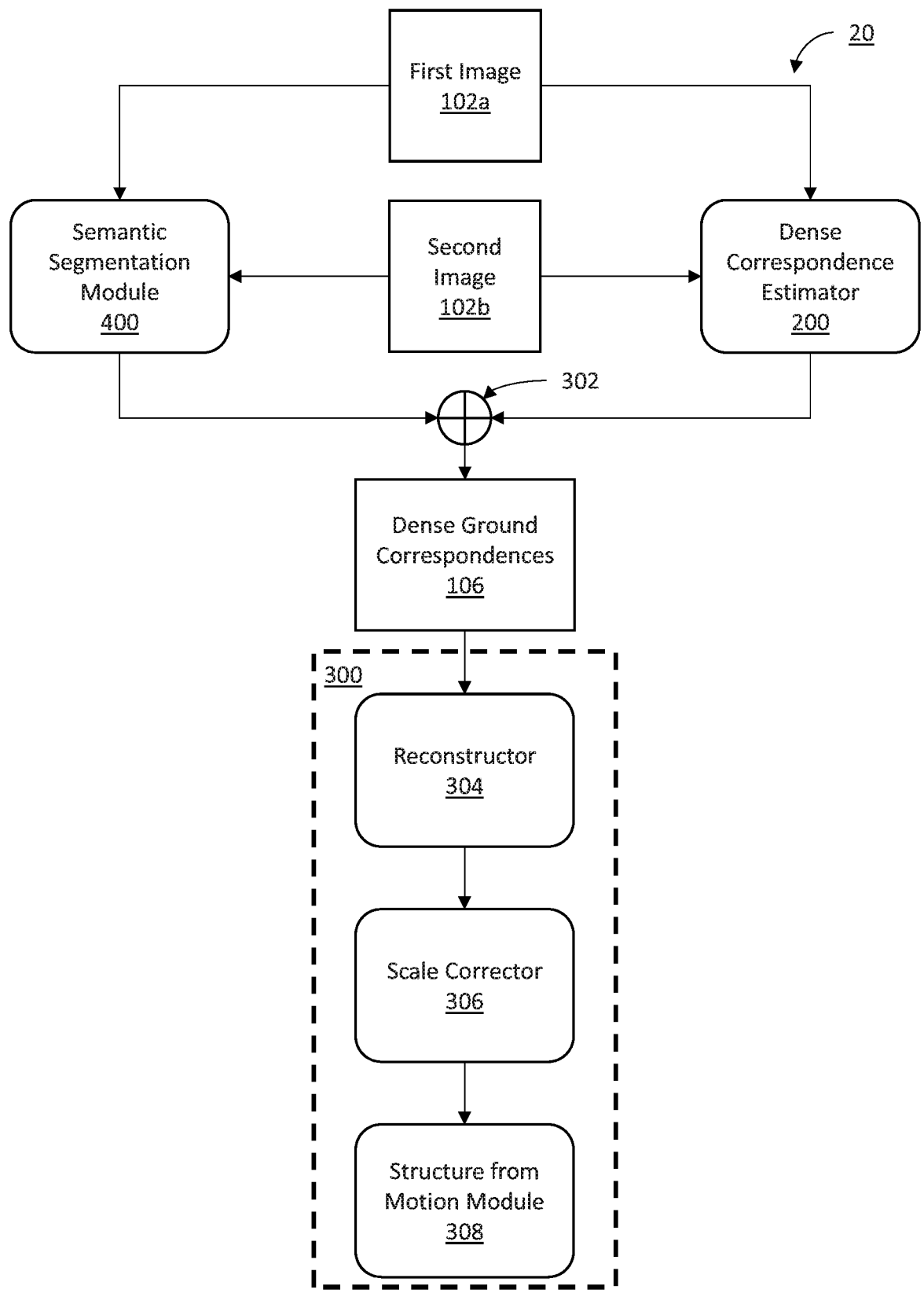
FIG. 6 is a block/flow diagram illustrating a system/method for localization with flexible ground reconstruction using two views of an environment, in accordance with the present principles.

Referring now to FIG. 6, a block/flow diagram of a system/method for localization with flexible ground reconstruction using two views of an environment is illustratively depicted in accordance with one embodiment of the present principles.

Dense correspondence estimation can be incorporated into a flexible ground modeling system 20. According to aspects of an embodiment, the flexible ground modeling system 20 includes a first image 102a and a second image 102b. The images 102a and 102b can be provided by, e.g., an image capturing device such as a camera, a camcorder, a library of images including a database, or other image sources. The first image 102a depicts objects in an area of an environment from one perspective while the second image 102b depicts objects in the area from another perspective. The first perspective and the second perspective can differ in, e.g., angle of the field of view on a common area, movement of objects in a common area, or combinations thereof. Thus, the first image 102a and the second image 102b can be used to determine differences for Structure-from-Motion analysis.

The first image 102a and the second image 102b are concurrently provided to a dense correspondence estimator 200 and a semantic segmentation module 400. The dense correspondence estimator 200 can include a dense correspondence estimator as described above, including hierarchical feature extracting and matching. Thus, the dense correspondence estimator 200 can include two hierarchical feature extractors, one or each image 102a and 102b. Each hierarchical feature extractor can concurrently extract features from the corresponding images 102a and 102b at both a shallow CNN layer and at a deep CNN layer to produce a deep feature image and a shallow feature image for each of the first image 102a and the second image 102b. The dense correspondence estimator 200 can include a Siamese structure such that the weights in the CNN of each hierarchical feature extractor are shared. The dense correspondence estimator 200 can produce dense correspondences from the feature images of the first image 102a and the second image 102b using, e.g., the matching units described above.

Concurrently, image segmentation can be performed on each image 102a and 102b with the semantic segmentation module 400. The semantic segmentation module 400 can include, e.g., a neural network trained for image segmentation, such as a CNN. In particular, the semantic segmentation module 400 can be trained to identify, e.g., a ground surface or terrain surface in each of the images 102a and 102b. Therefore, the semantic segmentation module 400 can include, e.g., one or more processing devices and one or more buffers, caches or memory devices for receiving, storing and accessing data pertaining to the first image 102a and the second image 102b.

The semantic segmentation, including the identified ground surface, from the semantic segmentation unit 400 can be combined with the dense correspondence estimates from the dense correspondence estimator 200 at a combiner 302. The combiner 302 uses the semantic segmentation and ground surface identification to filter the dense correspondence estimates to determine the dense correspondence estimates corresponding to the ground surface only. Thus, dense ground correspondences 106 are produced.

A localization module 300 can then be used to localize objects according to the dense ground correspondences 106. Accordingly, the localization module 300 can include, e.g., one or more processing devices and one or more buffers, caches or memory devices for receiving, storing and accessing data pertaining to the dense ground correspondences.

The dense ground correspondences 106 can be used by a reconstructor 304 to reconstruct a flexible, or non-planar representation of the ground surface. The flexible ground surface can, therefore, include any general 3D shape other than a simple 3D plane. Rather, by using dense ground correspondences 106, the actual shape of the ground surface in the environment can be reconstructed by the reconstructor 304, including, e.g., elevation changes and topological details. By using the hierarchical structure of the dense correspondence estimator 200, the estimated correspondences are dense and accurate, which provides sufficient measurements and enables the reconstructor 304 to recover a detailed non-planar 3D ground surface.

A scale corrector 306 can then be employed to use the reconstructed flexible ground surface to correctly set the scale for the reconstructed environment. Because the ground is accurately and precisely represented, the resulting scale correction is made more accurate and precise. Thus, a structure-from-motion module 308 can be provided with accurate and precise scaling. The structure-from-motion module 308 can include, e.g., monocular visual odometry or other structure-from-motion tasks.

Figure 7:
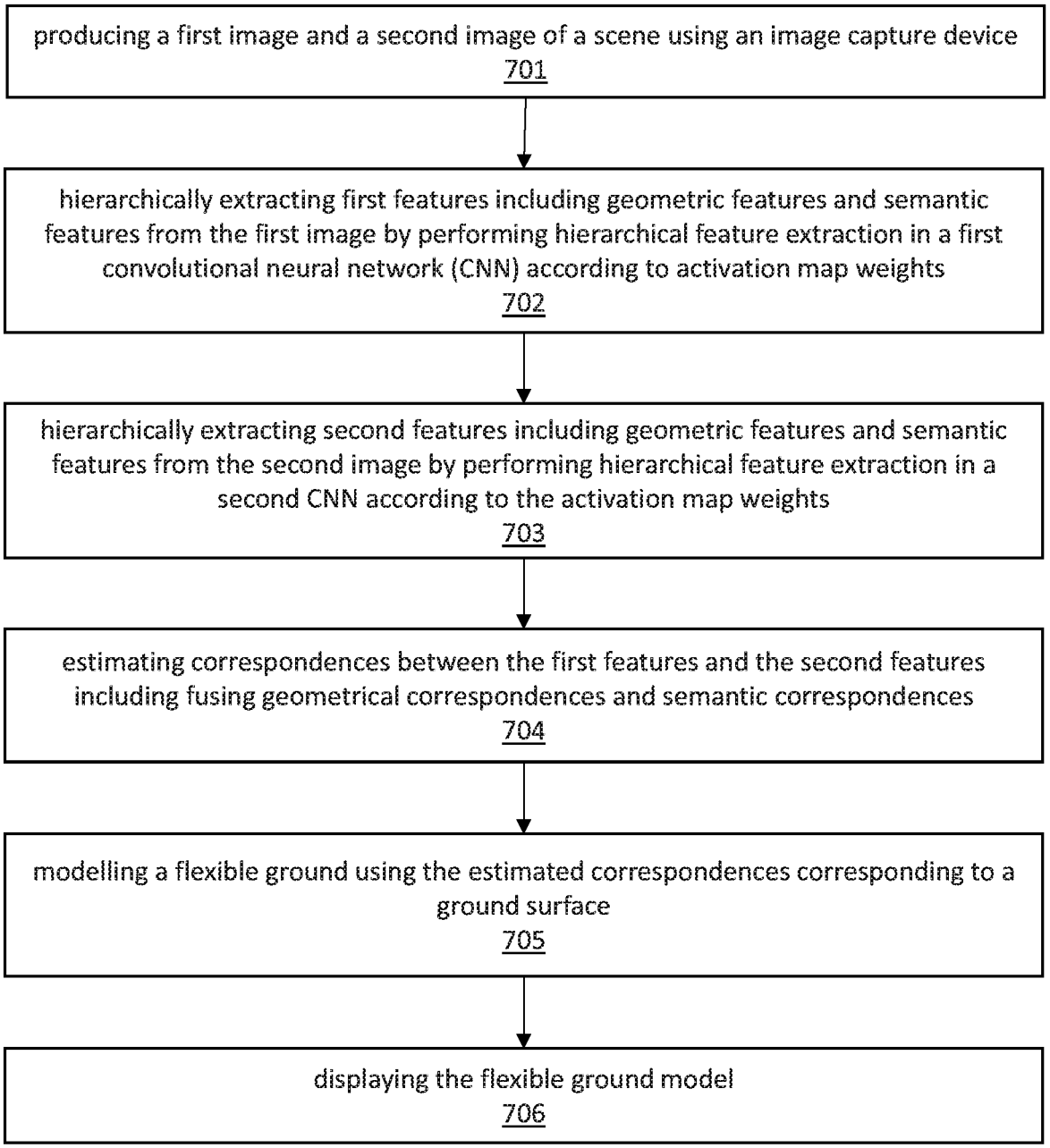
FIG. 7 is a flow diagram illustrating a system/method for flexible ground modeling using features extracted from two views of an environment, in accordance with the present principles.

Referring now to FIG. 7, a flow diagram of a system/method for flexible ground modeling using features extracted from two views of an environment is illustratively depicted in accordance with one embodiment of the present principles.

At block 701, produce a first image and a second image of an environment using an image capturing device.

The first image and the second image can be from the same or different image capturing devices, including, e.g., a camera, camcorder, or other device equipped with a sensor capable of capturing images. The first image and second image can be separated, either in location or in time, such that there are differences between the first image and the second image.

At block 702, hierarchically extract first features including low-level, geometric features and high-level, semantic features from the first image by performing hierarchical feature extraction in a first convolutional neural network (CNN) according to activation map weights.

Features can be extracted from the first image using a CNN. Rather than relying on extracting features from either a deep layer of the CNN, or from a shallow layer of the CNN, the features can be extracted from a combination of shallow and deep layers. Because deep layers of the CNN produce semantic features only whereas shallow layers of the CNN produce geometric features only. Extracting both shallow and deep features can leverage the qualities of both the shallow geometric features as well as the deep semantic features. In so doing, features are extracted from a hierarchy according to depth in the CNN.

At block 703, hierarchically extract second features including low-level, geometric features and high-level, semantic features from the second image by performing hierarchical feature extraction in a second CNN according to the activation map weights.

Similar to block 702, the second features can be extracted from the second image using a CNN. Rather than relying on extracting features from either a deep layer of the CNN, or from a shallow layer of the CNN, the features can be extracted from a combination of shallow and deep layers.

At block 704, estimate correspondences between the first features and the second features including hierarchical fusing of geometric correspondences and semantic correspondences.

According to an embodiment of the present invention, the geometric features of each of the first features and the second features are used to determine fine-grained, geometric correspondences. Additionally, the semantic features of each of the first features and the second features are used to determine coarse, semantic correspondences. The coarse correspondences can then be refined with the fine-grained correspondences to produce more accurate and precise correspondences.

Alternatively, the coarse correspondences can be determined. Upon estimation of the coarse correspondences, the coarse correspondences can be combined with the geometric features of the first features and the second features to estimate the refined correspondence estimates. Other methods of combining the geometric and semantic features of each of the first features and the second features are contemplated.

At block 705, model a flexible ground using the estimated correspondences corresponding to a ground surface.

Correspondences related to a ground surface of each of the first image and the second image can be determined. Using the ground correspondences, the ground can then be reconstructed. The ground can be difficult to model with computer vision algorithms because of visual uniformity. However, the hierarchical feature extraction and the hierarchical fusion of semantic and geometric correspondences facilitate the generation of dense and precise correspondence estimates and enable the reconstruction of a fine-grained and non-planar ground surface. Thus, rather than assuming a flat 3D plane for the ground, the actual contours and topography of a ground surface can be modeled with the accurate and precise correspondence estimates of the ground surface. Thus, a fine-grained and flexible ground surface can be recovered, which leads to more accurate 3D localization of objects.

At block 706, display the flexible ground model.

The flexible ground model, including a depiction of the environment captured in each of the first and the second image can be displayed to a user. The format of the display can include, e.g., a 2D image that can be reoriented to view the environment from a different angle, a map from a different angle as compared to either the first image or the second image, a depiction of a 3D model of elements and objects in the environment, or any other display formats to represent to the user the relative size, shape and location of elements and objects in the environment.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for detecting traffic scenarios, including:
an image capturing device which captures two or more images of an area of a traffic environment with each image having a different view of vehicles and a road in the traffic environment;
a hierarchical feature extractor configured for:
concurrently extracting first features and second features at multiple neural network layers from each of the two or more images of the area, with the first features and the second features including geometric features and semantic features,
estimating correspondences between the first features and the second features including using hierarchical fusing of geometric correspondences and semantic correspondences for each of the two or more images, and
refining the estimated correspondences with correspondences between the geometric features of each of the two or more images to generate refined correspondence estimates;
a traffic localization module for using the refined correspondence estimates to determine relative locations of elements and objects in the environment in three dimensions to automatically determine a traffic scenario according to the locations of vehicles according to a 3-dimensional (3D) model of a terrain generated based on the refined correspondence estimates; and a notification device configured to generate a notification of the traffic scenario based on the determined relative locations of elements and objects in the generated 3D model of the terrain.

2. The system as recited in claim 1, wherein the hierarchical feature extractor includes a convolutional neural network (CNN).

3. The system as recited in claim 1, wherein the geometric features for each of the two or more images are extracted from a second convolutional layer of the neural network.

4. The system as recited in claim 1, wherein the semantic features for each of the two or more images are extracted from a fifth convolutional layer of the neural network.

5. The system as recited in claim 1, wherein the hierarchical feature extractor includes a Siamese neural network such that each of the two or more images is processed with a separate neural network, and each neural network shares common weights in each activation map.

6. The system as recited in claim 1, wherein the hierarchical feature extractor includes a normalization module for normalizing extracted features.

7. The system as recited in claim 1, wherein the hierarchical feature extractor is further configured to:
estimate correspondences between the semantic features of each of the two or more images to generate the semantic correspondence estimates;
estimate correspondences between the geometric features of each of the two or more images to generate the geometric correspondence estimates; and
hierarchically fuse the geometric correspondence estimates and the semantic correspondence estimates by refining the semantic correspondence estimates with the geometric correspondence estimates.

8. The system as recited in claim 1, further including a semantic segmentation module for recognizing objects in the area of the traffic environment including recognizing the road and each of the vehicles.

9. The system as recited in claim 8, wherein the estimated correspondences are filtered by the semantic segmentation to yield ground correspondences for modeling a flexible ground surface and determining the locations of vehicles in the traffic environment.

10. The system as recited in claim 1, wherein the neural network trains activation map weights on-the-fly using hard-negative mining and correspondence contrastive loss at multiple layers of the CNN.

11. A method for detecting a traffic scenario, including:
capturing two or more images of an area of a traffic environment with each image having a different view of vehicles and a road in the traffic environment;
concurrently extracting first features and second features at multiple neural network layers from each of the two or more images of the scene using a hierarchical feature extractor, with the first features and the second features including geometric features and semantic features;
estimating correspondences between the first features and the second features including using hierarchical fusing of geometric correspondences and semantic correspondences for each of the two or more images and refining the estimated correspondences with correspondences between geometric features of each of the two or more images to generate refined correspondence estimates;
determining relative locations of elements and objects in the environment in three dimensions using the refined correspondence estimates to automatically determine a traffic scenario according to the locations of vehicles according to a 3-dimensional (3D) model of a terrain generated based on the refined correspondence estimates; and
generating a notification of the traffic scenario based on the determined relative locations of elements and objects in the generated 3D model of the terrain.

12. The method as recited in claim 11, wherein the hierarchical feature extractor includes a convolutional neural network (CNN).

13. The method as recited in claim 11, wherein the geometric features for each of the two or more images are extracted from a second convolutional layer of the neural network.

14. The method as recited in claim 11, wherein the semantic features for each of the two or more images are extracted from a fifth convolutional layer of the neural network.

15. The method as recited in claim 11, wherein the hierarchical feature extractor includes a Siamese neural network such that each of the two or more images is processed with a separate neural network, and each neural network shares common weights in each activation map.

16. The method as recited in claim 11, wherein the hierarchical feature extractor includes a normalization module for normalizing extracted features.

17. The method as recited in claim 11, wherein refining the correspondences further includes:
estimating correspondences between the semantic features of each of the two or more images to generate the semantic correspondence estimates;
estimating correspondences between the geometric features of each of the two or more images to generate the geometric correspondence estimates; and
hierarchically fusing the geometric correspondence estimates and the semantic correspondence estimates by refining the semantic correspondence estimates with the geometric correspondence estimates.

18. The method as recited in claim 11, further including performing semantic segmentation to recognize objects in the area of the traffic environment including recognizing the road and each of the vehicles.

19. The method as recited in claim 18, wherein the estimated correspondences are filtered by the semantic segmentation to yield ground correspondences for modeling a flexible ground surface and determining the locations of vehicles in the traffic environment.

20. The method as recited in claim 11, further including training activation map weights of the neural network on-the-fly using hard-negative mining and correspondence contrastive loss at multiple layers of the CNN.

* * * * *